US009086692B2

(12) United States Patent
Nixon et al.

(10) Patent No.: US 9,086,692 B2
(45) Date of Patent: Jul. 21, 2015

(54) CUSTOM FUNCTION BLOCKS FOR USE WITH PROCESS CONTROL SYSTEMS

(75) Inventors: Mark J. Nixon, Round Rock, TX (US); Ken Beoughter, Round Rock, TX (US); Brandon Hieb, Austin, TX (US); Terrence L. Blevins, Round Rock, TX (US); Dennis L. Stevenson, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 5 days.

(21) Appl. No.: 12/884,364

(22) Filed: Sep. 17, 2010

(65) Prior Publication Data

US 2011/0009985 A1    Jan. 13, 2011

Related U.S. Application Data

(62) Division of application No. 10/123,822, filed on Apr. 15, 2002, now Pat. No. 7,822,495.

(51) Int. Cl.
*G06F 9/44* (2006.01)
*G05B 19/42* (2006.01)
(Continued)

(52) U.S. Cl.
CPC .............. *G05B 19/0426* (2013.01); *G06F 8/10* (2013.01); *G06F 8/30* (2013.01); *G06F 8/33* (2013.01);
(Continued)

(58) Field of Classification Search
CPC ............... G06F 8/33; G06F 8/10; G06F 8/30; G06F 8/40; G06F 8/70
See application file for complete search history.

(56) References Cited

U.S. PATENT DOCUMENTS

| 5,504,906 A | 4/1996 | Lutoff |
| 5,799,086 A * | 8/1998 | Sudia .............................. 705/76 |

(Continued)

FOREIGN PATENT DOCUMENTS

| CN | 1242690 A | 1/2000 |
| CN | 1338841 | 3/2002 |

(Continued)

OTHER PUBLICATIONS

Notice of Reasons for Rejection for Japanese Application No. 2009-92496, mailed Sep. 6, 2011.
(Continued)

*Primary Examiner* — Kenneth M Lo
*Assistant Examiner* — Sunray R Chang
(74) *Attorney, Agent, or Firm* — Marshall, Gerstein & Borun LLP (57) ABSTRACT

A system and method for creating and incorporating a function block within a process control system enables a user of the process control system to generate a function block by combining a plurality of files selected from a group of files provided by the manufacturer of the process control system to form a source code file associated with the function block. The user can modify the function block source code file to include a procedure, routine or algorithm that is not provided by the manufacturer and can send the modified source code file to the manufacturer for validation. If the function block source code file is validated, a security measure such as a digital signature is provided to the user that enables the user to incorporate the function block within the process control system. The function blocks can be used to incorporate a new function into a process control application or to operatively integrate a data source external to a process control application with the process control application via data mapping functions performed by the function blocks.

25 Claims, 2 Drawing Sheets

(51) Int. Cl.
*G05B 19/042* (2006.01)
*G06F 9/45* (2006.01)

(52) U.S. Cl.
CPC .. *G06F 8/40* (2013.01); *G06F 8/70* (2013.01);
*G05B 2219/23258* (2013.01); *G05B 2219/25232* (2013.01); *G05B 2219/25428* (2013.01)

(56) References Cited

U.S. PATENT DOCUMENTS

| | | | | |
|---|---|---|---|---|
| 5,862,052 | A * | 1/1999 | Nixon et al. | 713/1 |
| 5,909,368 | A * | 6/1999 | Nixon et al. | 700/2 |
| 5,995,916 | A * | 11/1999 | Nixon et al. | 702/182 |
| 6,032,208 | A * | 2/2000 | Nixon et al. | 710/64 |
| 6,044,305 | A * | 3/2000 | Larson et al. | 700/87 |
| 6,195,591 | B1 * | 2/2001 | Nixon et al. | 700/83 |
| 6,445,962 | B1 * | 9/2002 | Blevins et al. | 700/37 |
| 6,510,351 | B1 * | 1/2003 | Blevins et al. | 700/18 |
| 6,615,090 | B1 * | 9/2003 | Blevins et al. | 700/26 |
| 6,633,782 | B1 * | 10/2003 | Schleiss et al. | 700/26 |
| 6,868,538 | B1 * | 3/2005 | Nixon et al. | 717/100 |
| 2002/0013865 | A1 * | 1/2002 | Toh et al. | 710/8 |

FOREIGN PATENT DOCUMENTS

| | | |
|---|---|---|
| GB | 2 345 360 | 7/2000 |
| JP | 5-216739 A | 8/1993 |
| WO | WO-97/12460 | 4/1997 |

OTHER PUBLICATIONS

Second Office Action for Chinese Application No. 200810149081.6, dated Jan. 12, 2012.
Examination Report under Section 18(3) issued in GB0308581.8 application by the United Kingdom Patent Office on Feb. 28, 2005.
Translation of Office Action for Chinese Application No. 200610142194.4, dated Mar. 7, 2008.
Notice of Reasons for Rejection for Japanese Application No. 2003-145504, dated Mar. 11, 2008.
Notice of Reasons for Rejection for Japanese Application No. 2003-145504, dated Oct. 7, 2008.
Decision of Rejection for Japanese Application No. 2003-145504, dated May 12, 2009.
Office Action for related Chinese Application No. 200810149081.6, dated Sep. 3, 2010.
Decision on Rejection for Chinese Application No. 200810149081.6, dated Jul. 12, 2012, corresponding limitations are not related.
Office Action for German Application No. 10 2004 029 022.9, dated Mar. 9, 2012.

* cited by examiner

CUSTOM FUNCTION BLOCKS FOR USE WITH PROCESS CONTROL SYSTEMS

CROSS-REFERENCES TO RELATED APPLICATIONS

The present application is a divisional of U.S. patent application Ser. No. 10/123,822 entitled "Custom Function Blocks for Use with Process Control Systems," filed on Apr. 15, 2002, the disclosure of which is hereby expressly incorporated herein by reference.

FIELD OF THE INVENTION

The present invention relates generally to process control systems and, more specifically, to a system and technique that enables a user or operator of a process control system to create custom function blocks for carrying out control activities in the process control system.

DESCRIPTION OF THE RELATED ART

Modern process control systems are typically microprocessor-based distributed control systems (DCSs). A traditional DCS configuration includes one or more user interface devices, such as workstations, connected by a databus (e.g., Ethernet) to one or more controllers. The controllers are generally located physically close to a controlled process and are connected to numerous electronic monitoring devices and field devices such as electronic sensors, transmitters, current-to-pressure transducers, valve positioners, etc. that are located throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can add an additional controller (having an appropriate control algorithm) connected to appropriate sensors, actuators, etc. Alternatively, if the user desires to modify an existing process, new control parameters or control algorithms may, for example, be downloaded from a user interface to an appropriate controller via the databus.

To provide for improved modularity and inter-manufacturer compatibility, process controls manufacturers have more recently moved toward even further decentralization of control within a process. These more recent approaches are based on smart field devices that can communicate with each other and/or controllers using an open protocol such as the HART®, PROFIBUS®, WORLDFIP®, Device-Net®, CAN, and Fieldbus protocols. These smart field devices are essentially microprocessor-based devices such as sensors, actuators, etc. that, in some cases, such as with Fieldbus devices, also perform control loop functions traditionally executed by a DCS controller. Because some smart field devices provide control capability and communicate using an open protocol, field devices from a variety of manufacturers can communicate with each other on a common digital databus and can interoperate to execute a control loop without the intervention of a traditional DCS controller.

As is well known, process control system controllers and smart field devices such as, for example, Fieldbus devices, may include one or more function blocks that perform control functions or portions of a control function. These function blocks may, for example, perform analog input functions, analog output functions, proportional-integral-derivative (PID) control functions, or any other desired control functions. Function blocks may be communicatively linked with other function blocks within a controller or smart field device or with function blocks within other controllers or smart field devices to carry out any desired control function. For example, an analog input block may be used to monitor a fluid flow via a flow sensor and a PID block may process a fluid flow value provided by the analog input block to provide responsive signals via an analog output block to an actuator that modulates the position of a valve plug. Thus, these function blocks may be communicatively linked to one another to form a PID-based control loop that controls the flow of fluid through a valve.

Process controls manufacturers or providers typically provide system users with one or more standard libraries that include various types of predefined function blocks. Typically, the predefined function blocks may be selected and combined with each other as directed by the system user to implement an overall process control scheme. Some process controls manufacturers also provide graphical user interfaces that enable users to visualize the logical relationships between function blocks, which greatly facilitates the creation of an overall process control scheme, especially in situations where the process control scheme is complex.

Once the user has created an overall process control scheme by selecting which function blocks are to be executed and defining the logical relationships between the selected function blocks, one or more of the function blocks may be instantiated within the process control system to carry out the overall process control scheme. Because the predefined function blocks are typically instantiated within the controllers and/or smart field devices distributed throughout the process control system, the predefined function blocks may be executed in a synchronous manner at a relatively high speed.

If a process control scheme requires the execution of a special function, application or algorithm that has not been provided by the control system manufacturer or provider in a standard function block library, the system user typically creates and instantiates an independent process that carries out that special function, application or algorithm. In practice, the independent process is usually created and instantiated within a workstation or some other computer system that is communicatively coupled to the controllers and other devices distributed throughout the process control system via a communication network such as, for example, a local area network. As a result, integration of the independent process carrying out the special function, application or algorithm with the overall process control scheme typically requires the independent process to communicate with other portions of the overall control process, via the communication network.

The difficulty in integrating a special user-created or defined process that performs a special function, application or algorithm with an overall process control scheme is compounded by the fact that communications between a workstation and a controller or some other process control system device communicatively coupled to the local area network is usually based on a proprietary message format or protocol that is not known by system users. To alleviate this integration difficulty, some process controls manufacturers may permit communications between their control processes and other processes or systems using communications based on a common data language such as, for example, OLE for process control (OPC). Common data languages such as OPC, for example, are typically based on an extensible markup language (e.g., XML) or the like that enables system users to wrap information or messages from their specially created or custom process (which performs a special function, application or algorithm) in a schema or format that can be interpreted by the system carrying out the overall process control scheme. Likewise, the user-defined custom process can interpret and process information or messages received from the process control system, which have been wrapped or formatted using the extensible markup language schema, by having knowledge of the schema. In this manner, process controls manufacturers or providers may enable a user to integrate other systems and processes, some of which may be created by the user to carry out a special function, application or algorithm without having to reveal the proprietary message format or protocol used in carrying out communications between the workstation or other computer system and the controllers distributed throughout the process control system.

Known techniques for enabling integration of or communications between a user-defined process or system, or some other process or system, with an overall process control system typically do not allow direct communications between a user-defined process and the controllers and/or smart field devices within a process control system. To the contrary, these known techniques (some of which are based on XML) require the user-defined process or system to communicate with the controllers and/or smart field devices via a workstation or other computer system, which is coupled to the controllers and other devices via a communication network. Unfortunately, communications via the communication network (e.g., a LAN) are relatively slow, particularly in comparison to the communications that take place between controllers and smart field devices. Additionally, the use of an extensible markup language or the like to enable the exchange of information between the controllers and other devices within a process control system and a user defined process or system produces additional communication overhead. Such additional communication overhead further slows the effective rate at which information or messages can be conveyed between the user-defined process or system and the process control system controllers and/or other devices.

A further disadvantage of having to convey information between a user-defined process and the overall process control routine being carried out by a process control system is that the information or messages provided or used by the user-defined process or system are not typically synchronized with the activities being carried out by the controllers and/or the smart fields connected to the controllers. Thus, in most, if not all, process control systems, the communications occurring via the communication network that communicatively couples the workstations to the controllers have a relatively low data throughput and are not synchronized with the communications occurring between controllers and field devices. For some applications, the inability to more tightly integrate or couple a special user-defined process or system with the operation of the overall process control system by, for example, enabling a more rapid exchange of information between the two systems and enabling synchronization between the two systems, may make implementation of the user-defined process or system impractical or, in some cases, impossible.

SUMMARY

The custom function blocks and the manner of creating custom function blocks described herein enables a process control system user to tightly integrate or couple special functions, applications, algorithms and/or processes, which may be defined by the user, with the operation of an overall process control system. In particular, the custom function block creation technique described herein may use predefined libraries that contain templates, routines, procedures, tables, etc., which may be selected, modified and/or combined by a user to assemble, generate or define one or more function block libraries, each of which may contain one or more custom function blocks. A text editor, a graphical user interface, function block wizards or virtual experts, etc. may be used to facilitate the generation of the custom function blocks.

The predefined libraries used by the system and technique described herein may include various types of function block components, some of which are required by the process control system for proper integration of a function block into an overall process control routine and some of which may not be required. A user may employ the system and technique described herein to create, generate or define one or more custom function blocks that implement functions, applications, algorithms or processes not provided by the process control system provider or manufacturer in a standard function block library. Generally speaking, the user selects and, if desired, modifies required function block components from the predefined libraries containing function block components and includes the selected components in the custom function blocks. The user may also include additional functions or algorithms to be carried out by the custom function blocks by entering appropriate additional code or software to the custom function block definitions.

The system and technique described herein enables a user to implement custom functions, applications or algorithms, etc. that have not been provided by the process control system provider or manufacturer in a standard function block library by creating new or custom function blocks that are structurally similar or identical to the function blocks provided in the standard function block library. As a result, the custom functions (i.e., the custom function blocks) can be compiled and used within the process control system like standard function blocks. Thus, the processes, applications, algorithms, etc. defined within the custom function blocks can communicate within the overall process control routine at a relatively high speed because the custom functions, applications or processes do not have to communicate via a workstation and a LAN using an extensible markup language, for example. Furthermore, because the custom function blocks can be compiled and downloaded into controllers and/or smart field devices in a manner similar or identical to that of standard function blocks, communications between the custom function blocks and other standard function blocks within the process control system can occur in a synchronous manner (i.e., the operations of the custom function blocks can be scheduled together with the operations of standard function blocks).

In accordance with one aspect, a method of creating a function block for use with a process control system may select an initialization routine from a plurality of source files, may select a periodic execution routine from the plurality of source files and may select a write checking routine from the plurality of source files. Additionally, the method may associate the initialization routine, the periodic execution routine and the write checking routine with the function block and may modify one of the initialization routine, the periodic execution routine and the write checking routine to include a procedure that is not provided with the process control system.

In accordance with another aspect, a method of creating a function block for use in a process control system may combine a plurality of files from a group of files generated by a provider of the process control system to form a file associated with the function block and may modify one of the plurality of files within the file associated with the function block to include a procedure not included within the group of files.

In accordance with still another aspect, a system for creating a function block for use with a process control system may include a computer readable medium, a first software stored on the computer readable medium and adapted to be executed by the process control system to select an initialization routine from a plurality of source files, and a second software stored on the computer readable medium and adapted to be executed by the process control system to select aperiodic execution routine from the plurality of source files. The system may also include a third software stored on the computer readable medium and adapted to be executed by the process control system to select a write checking routine from the plurality of source files, a fourth software stored on the computer readable medium and adapted to be executed by the process control system to associate the initialization routine, the periodic execution routine and the write checking routine with the function block, and a fifth software stored on the computer readable medium and adapted to be executed by the process control system to modify one of the initialization routine, the periodic execution routine and the write checking routine to include a procedure not provided with the process control system.

In accordance with yet another aspect, a method of incorporating a custom function block within a process control system may generate the custom function block by combining a plurality of files from a group of files generated by a provider of the process control system to form a source code file associated with the function block and may modify one of the plurality of files within the source code file to include a procedure not included within the group of files. The method may also compile and link the source code file to form a compiled/linked custom function block file and may transfer the compiled/linked custom function block file to the provider of the process control system. Further, the method may validate the compiled/linked custom function block file, may append a security measure to the compiled/linked custom function block file to form a validated custom function block file and may transfer the validated custom function block file to a user of the process control system. Additionally, the method may incorporate the validated custom function block file within the process control system.

In accordance with still another aspect, a method of using a custom function block conveys information from a data source to the custom function block, processes the information from the data source based on a function within the custom function block, and conveys at least some of the processed information to a process control system application.

DESCRIPTION

The custom function blocks and the manner of creating custom function blocks described herein enables a process control system user to tightly integrate or couple special functions, applications, algorithms and/or processes, which may be defined by the user, with the operation of an overall process control system. More specifically, the custom function block creation technique described herein may use pre-defined libraries that contain templates, routines, procedures, tables, etc., which may be selected, modified and/or combined by a user to assemble, generate or define one or more function block libraries, each of which may contain one or more custom function blocks. A text editor, a graphical user interface, function block wizards or virtual experts, etc. may be used to facilitate the generation of the custom function blocks.

The predefined libraries used by the system and technique described herein may include various types of function block components, some of which are required by the process control system for proper integration of a function block into an overall process control routine and some of which may not be required. A user may employ the system and technique described herein to create, generate or define a one or more custom function blocks that implement a function, application, algorithm or process not provided by the process control system provider or manufacturer in a standard function block library. Generally speaking, the user selects and, if desired, modifies required function block components from the pre-defined libraries containing function block components and includes the selected components in the custom function blocks. The user may also include additional functions or algorithms to be carried out by the custom function blocks by entering appropriate additional code or software to the custom function block definitions.

The system and technique described herein enables a user to implement custom functions, applications or algorithms, etc. that have not been provided by the process control system provider or manufacturer in a standard function block library by creating new or custom function blocks that are structurally similar or identical to the function blocks provided in the standard function block library. As a result, the custom functions (i.e., the custom function blocks) can be compiled and used within the process control system like standard function blocks. Thus, the processes, algorithms, etc. defined within the custom function blocks can communicate within the overall process control routine at a relatively high speed because the custom functions or processes do not have to communicate via a workstation and a LAN using an extensible markup language, for example. Furthermore, because the custom function blocks can be compiled and downloaded into controllers and/or smart field devices in a manner similar or identical to that of standard function blocks, communications between the custom function blocks and other standard function blocks within the process control system can occur in a synchronous manner (i.e., the operations of the custom function blocks can be scheduled together with the operations of standard function blocks).

Figure 1:
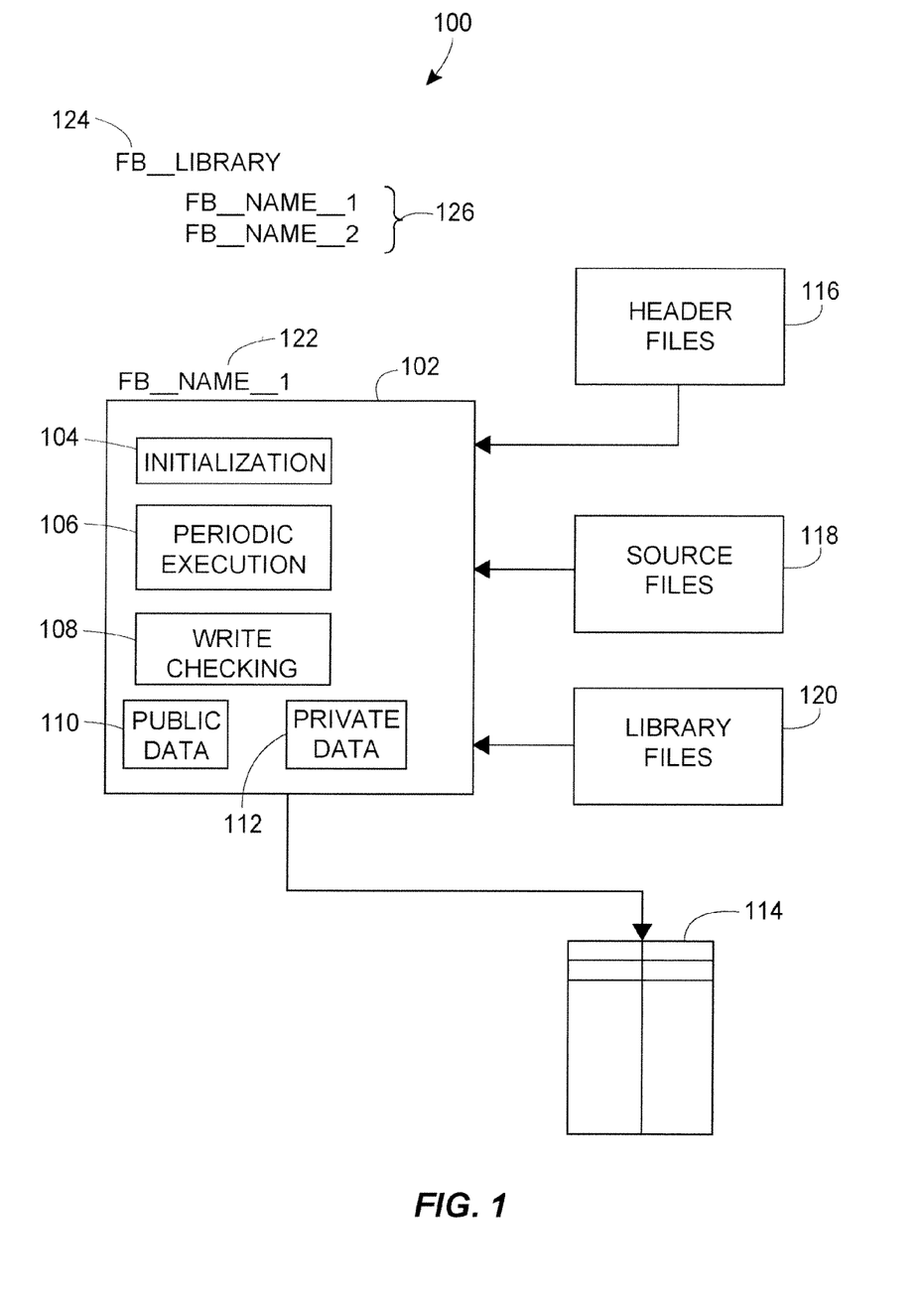
FIG. 1 is an exemplary block diagram generally depicting a structure and generation technique for a custom function block.

FIG. 1 is an exemplary block diagram 100 generally depicting a structure and generation technique for a custom function block 102. As shown in FIG. 1, the custom function block 102 includes an initialization procedure or routine 104, a periodic execution routine 106 and a write checking routine 108. The routines 104-108 may be generally referred to as behaviors or methods of the custom function block 102. The routines 104-108 may include various attributes that use public data 110 and/or private data 112. The attributes and, thus, the public data 110 and or private data 112 associated therewith, may be obtained from a process control system (not shown) in which the custom function block is instantiated via an attribute table 114. As is also shown in FIG. 1, and as is described in greater detail below, the custom function block 102 may be generated or defined using a collection of header files 116, a collection of source files 118 and/or a collection of library files 120. Further, the custom function block 102 may have a name 122 associated therewith and may be part of a custom function block library 124 that includes a plurality of custom function blocks 126.

The initialization routine 104, when executed, is adapted to initialize the public data 110 and private data 112 associated with the custom function block 102. The initialization values for the data 110 and 112 are preferably, but not necessarily, default or initial values, in which case the initialization routine 104 is executed once prior to execution of the periodic execution routine 106. Of course, if desired, the initialization routine 104 may be executed more than once to suit the requirements of a particular application or function needed by the user.

The write checking procedure or routine 108, when executed, is adapted to validate data that is written from an external source (i.e., outside of the function block 102) to the public data 110 of the custom function block 102. The write checking routine 108 is preferably invoked in response to an attempt by an external source to write data or information to the public data 110. The write checking routine 108 may determine whether the current state of the function block 102 permits an external write to be performed on the target data, whether the target data can be written to by an external source and/or whether the information or data being written to the target data is within one or more predetermined acceptable limits. For instance, the block 102 may be currently using the target data and allowing an external source to change the target data prior to completing some procedure, series of steps, etc., which may lead to corrupt or inaccurate results. Of course, any other different or additional types of checks could be performed by the write checking routine 108.

The periodic execution routine 106, when executed, is adapted to carry out the special function or algorithm that the user needs to implement within the control system and which may not have been available via a standard function block provided by the control system provider or manufacturer. By way of example, the periodic execution routine 106 may include a mapping function or algorithm that enables information or data to be exchanged between the control system and some other application, system or device with which the control system would otherwise not be able to communicate. Alternatively or additionally, the periodic execution routine 106 may include a profitability calculation and/or some other financial calculation associated with the process control system that typically would not be provided within a standard function block. Of course, the number and types of functions or algorithms that can be included within the periodic execution routine 106 are virtually unlimited. In practice, the special function or algorithm executed by the periodic execution routine 106 typically defines the overall behavior of the custom function block 102 and, thus, the name of the custom function block 102 may reflect that particular behavior. For example, if the periodic execution routine 106 includes a profitability calculation function or algorithm, the function block name 122 may be "FB_PROFITCALC" to reflect that function or algorithm.

The periodic execution routine 106 may include algorithms that use the public data 110 and/or the private data 112. Although the public data 110 is generally available for use by any custom or standard function blocks instantiated within a control system, some or all of the public data 110 may be used exclusively by the custom function block 102. The public data 110 may include, for example, external data that the custom function block 102 transfers from an external data area (i.e., any data area outside of the custom function block 102) to the public data 110 of the custom function block 102. The public data 110 may also include, for example, data that the periodic execution routine 106 derives during execution using the public data 110 and/or the private data 112.

On the other hand, the private data 112 is data that is not accessible by other function blocks. Typically, the private data 112 is used to track historical block execution information or data associated with the custom block 102 and may be used in subsequent executions of the block 102 or may be used to control the behavior of the block 102 in response to an abnormal event or events. Similar to the public data 110, the private data 112 may include external data that the periodic execution routine 106 transfers from an external data area to the private data 112 and/or may include data that the periodic execution routine 106 derives from the public data 110 and/or the private data 112.

The public data 110 and the private data 112 may be of any desired computational type. For example, floating point, floating point arrays, eight bit, sixteen bit and/or thirty-two bit signed or unsigned integers (singly or doubly dimensioned), ASCII strings, unicode strings, etc. may be used in any desired combination. Additionally, each of the data items within the public data 110 and the private data 112 may be given a name that can be referenced by the periodic execution routine 106 or another periodic execution routine within another function block.

The attribute table 114 maps the attributes used by the custom function block 102 to information or data within the control system within which the custom function block 102 is instantiated. In particular, each of the attributes defined within the custom function block 102 may include, for example, a pointer that refers to a particular row or portion of the attribute table 114 that maps the attribute to a data source within the control system. Although there is preferably a unique correspondence between each of the attributes within the custom function block 102 and the rows of the attribute table 114, other function blocks may also include pointers that use the mapping function provided by the attribute table 114. In other words, each of the rows within the attribute table 114 may have a one-to-many relationship such that each row of the attribute table 114 may be referenced or pointed to by more than one function block.

To build, create or generate the custom function block 102, the user may use a text editor, a graphical user interface or any other technique that enables the viewing and manipulation of software source code files and/or representations thereof. As shown in FIG. 1, the user may cause selected files from the header files 116, the source files 118 and the library files 120 to be combined to create the custom function block 102.

The header files 116 include definitions of different types of structures and calling interfaces that may be used by a function block within the target process control system (i.e., the process control system in which instances of the custom function block 102 will be instantiated). The library files 120, on the other hand, include helper routines that may be needed to carry out routine activities within the target control system. For example, the library files 120 may include one or more routines that facilitate the establishment of desired operational modes within the target process control system.

The source files 118 are software source code files that include the initialization routine 104, the periodic execution routine 106 and the write checking routine 108. The source files 118 may be based on a high level programming language such as, for example, C++ or may be based on any other desired programming language. To facilitate a user's creation of a custom function block such as, for example, the custom function block 102, each of the source files 118 may include extensive comments that clearly explain the purposes and functions of the various software code portions contained within the source files 118. For example, the comments may clearly indicate which ones or portions of the source files 118 are responsible for each of the routines 104-108. Further, comments within the source files 118 may explicitly indicate where the user should insert source code for the desired custom algorithm or function within the periodic execution routine 106. Still further, the comments may suggest the use of one or more of the helper routines contained within the library files 120 and may additionally suggest or explain how those helper routines may be integrated within the custom function block 102. Preferably, but not necessarily, the source files 118 also include references or pointers to ones of the header files 116 that may be needed to create, build or generate the custom function block 102.

Although FIG. 1 depicts a single custom function block 102 being generated, created or built from the header files 116, the source files 118 and/or the library files 120, a plurality of custom function blocks may be created if desired. In the case where a plurality of custom function blocks is created, these function blocks may be collected within one or more libraries of custom function blocks.

Additionally, it is important to recognize that the particular programming language used for the header files 116 and the source files 118 may be selected to facilitate a user's generation of custom function blocks. For example, C++ is particularly well suited for programming using object-oriented techniques, which provides an intuitive framework for generating software algorithms for relatively complex process control systems. Of course, any other programming language and/or programming techniques could be used instead.

The contents of the header files 116, the source files 118 and the library files 120 are configured to satisfy the particular requirements of the target control system. In other words, the library files 120 may include helper routines that carry out activities such as, for example, mode control activities, status activities, debugging activities, etc. in a manner that is compatible with the particular requirements of the target control system. Likewise, the header files 116 and the source files 118 may include source code that, when compiled, linked and executed by the control system will be compatible with the particular requirements of the target control system.

Thus, the custom function blocks described herein may be used to tightly integrate or couple special functions, applications algorithms and/or processes, which may be defined by the user, with the operation of an overall process control system. More specifically, a control system user or operator may create, generate or define one or more custom function blocks or libraries of custom function blocks to add new functionality to the control system that would not otherwise be provided within a standard function block library by the control system manufacturer or supplier. In particular, the process control system user or operator may create or define one or more custom function blocks that enable the process control system to perform analyses or calculations that could not be performed using the standard function blocks provided by the control system manufacturer or supplier. For example, a process control system user or operator may create a custom function block that performs a profit calculation based on one or more parameter values within the process control system. Of course, one or more custom function blocks may be defined or created by the system user or operator to make any desired calculation based on parameter values obtained from within the process control system and, as described in greater detail below, based on parameter values obtained from other devices and/or systems that may not ordinarily be integrated with and, thus, that may not ordinarily communicate with the process control system.

The custom function blocks described herein may be used to upgrade the functionality of older process control systems. For example, advanced control capability may be added to an older control system that provides only basic control capability by creating custom function blocks that perform the advanced control functions. Similarly, the custom function blocks described herein may be used to upgrade or increase the functionality of basic control systems or controllers such as, for example, programmable logic controllers. More functionality may be appended to a basic controller or control system by, for example, building a custom function block layer that interposes between the basic controller or control system and another more complex process control system, operator terminal, etc.

Alternatively or additionally, the system user or operator may create custom function blocks or libraries of custom function blocks that enable a process control system to interface or integrate with other devices, equipment and/or systems provided by other manufacturers. In the case where the custom function blocks described herein are used to interface or integrate a process control system associated with one manufacturer or supplier with a system or device associated with another manufacturer or supplier, the custom function blocks may defined or created by the user of the process control system to route, map, translate and/or re-format data or parameters provided by the other system or device for use by the process control system. Similarly, the custom function blocks may also function to route, map, translate and/or re-format data or parameters provided by the process control system for use by the other system or device.

By way of example, the custom function blocks described herein may be used to link a function block associated with a first process control system with a function block associated with a second process control system, where the first and second process control systems may be provided by different manufacturers or suppliers. In this manner, for example, PID control loops within each of the first and second process control systems may be cascaded. Of course, the custom function blocks described herein may be used to create more complex linkages between multiple function blocks that are associated with multiple, different process control systems. For example, two or more function blocks associated with different respective control systems, devices or equipment may be communicatively linked to each other to carry out one or more process control activities.

It is important to recognize that, in contrast to prior systems and techniques, the custom function blocks described herein enable function blocks of dissimilar origin to be linked together. In other words, a function block associated with a Fieldbus system may be linked via one or more custom function blocks to a function block associated with, for example, a PROVOX system. As noted above, the custom function blocks described herein provide a standard shell or parameter interface that may be used to convey information from one type of control system or device to another type of control system or device in a seamless manner. For example, the conventions associated with the Mode, Status and BLOCK_ERR parameters of a Fieldbus function block may be significantly different from the conventions and/or corresponding parameters associated with a non-Fieldbus function block. One or more of the custom function blocks described herein may be created to map, translate and/or mute data or information being conveyed between Fieldbus function blocks and non-Fieldbus function blocks. In this manner, Fieldbus parameters such as, for example, mode, status and BLOCK_ERR, may be mapped to or associated with appropriate parameters with non-Fieldbus function blocks.

The custom function blocks described herein also enable applications and algorithms that are external to a process control system implementation (i.e., that are not executed as part of or integrated with the software performing the process control activities) to be tightly or seamlessly integrated with the process control system implementation. Because the custom function blocks described herein are processed or used like standard function blocks, the custom function blocks enable an external system, application or algorithm to appear to be part of the process control system software and enable the execution of the external system, application or algorithm to be synchronized with the execution of the overall process control scheme.

The tight or seamless integration of external systems, applications or algorithms with a process control system via the custom function blocks described herein enables these external systems, applications or algorithms to be integrated with the alarm management activities performed by the process control system, enables the system user or operator to use the standard configuration tools, debugging tools, simulation tools, etc. which are provided with the process control system, in connection with the custom function blocks and, thus, with the external systems, applications or algorithms to which they correspond. By way of example, a condition monitoring application such as a rotating equipment monitoring application, may be integrated with a process control system via one of more custom function blocks so that parameters monitored by the condition monitoring application may be used to generate a device alert within the process control system. Additionally, the integration of external systems, applications or algorithms using the custom function blocks described herein enables these external systems, applications or algorithms to participate in the redundancy functions provided by the process control system and facilitates the viewing of information relating to the function blocks associated with the external systems, applications or algorithms using operator interface and/or documentation systems provided within the process control system. Still further, the tight integration between a process control system and an external system, application or algorithm that can be provided by the custom function blocks described herein may be used to facilitate the management of the process control system state during configuration downloads. For example, the custom function blocks associated with an external system, application or algorithm may be used to hold a last value associated with the external system, application or algorithm during a download.

Thus, the custom function blocks described herein may be communicatively interposed between a process control system application and a data source. More specifically, information, which may be process control information, from the data source may be conveyed to a custom function block and the function block may process at least some of the information from the data source based on a function within the custom function block. At least some of the processed information may then be conveyed to a process control system application. The data source may be a function block, a device or a parameter associated with the process control system application. Alternatively, the data source may be a system, a device, an algorithm or an application that is external to the process control system application.

The processing of information received from a data source by a custom function block may include mapping some of the information received from the data source and/or some of the processed information to one or more parameters associated with or used by a process control system application. Alternatively, or additionally, a custom function block may calculate a value for use by a parameter associated with a process control system application. The calculations performed by custom function blocks may be calculations that are not typically performed, or which could not be performed without the use of the custom function blocks described herein. Thus, in general, the custom function blocks described herein may be used to convey information between a process control system application and a data source based on functions performed by the custom function blocks. In this manner, the custom function blocks described herein enable an operative integration of a data source external to a process control application with the process control application. If desired, the custom function blocks described herein may calculate a value based on information received from a data source and may associate that value with a parameter used by a process control system application with which the function block is associated. More generally, the custom function blocks described herein may perform one or more functions such as, for example, data mapping functions, data conversion functions, data translation functions, etc.

Figure 2:
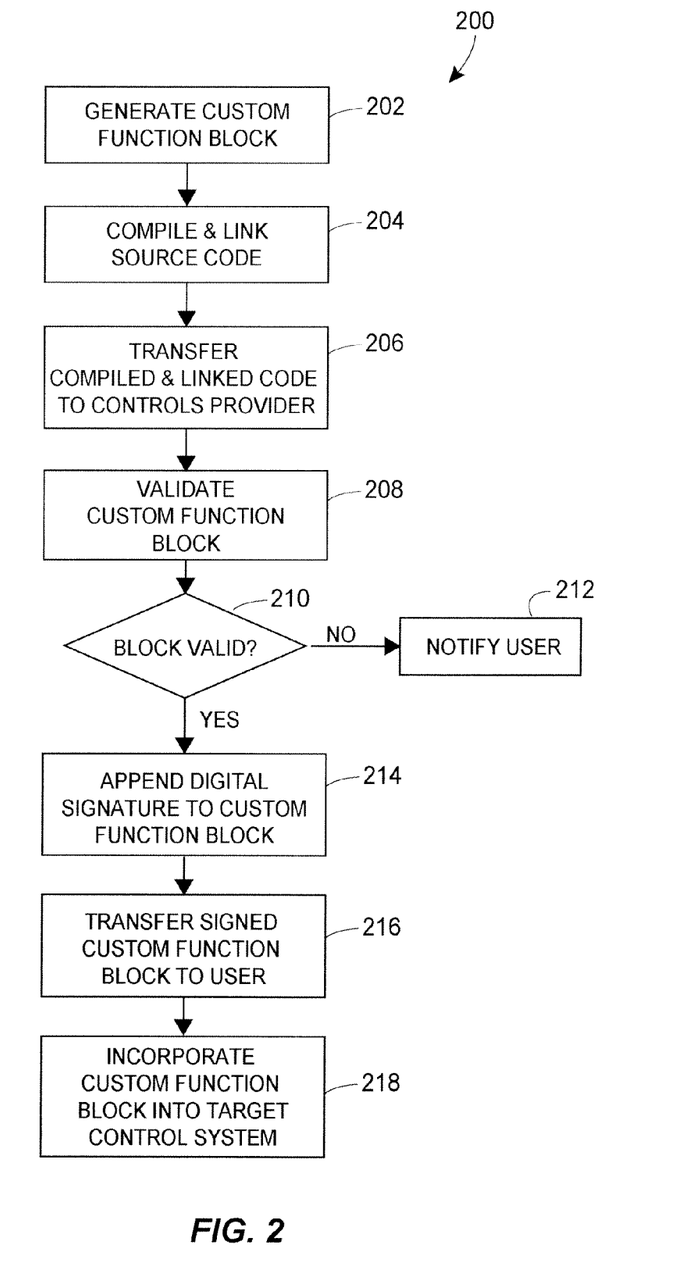
FIG. 2 is an exemplary flow diagram depicting one manner in which a control system provider or manufacturer may control the use of custom function blocks within their control system.

FIG. 2 is an exemplary flow diagram 200 depicting one manner in which a control system provider or manufacturer may control the use of custom function blocks within their control system. At block 202, a control system user or operator may generate, create or build a custom function block such as, for example, the custom function block 102 shown in FIG. 1. The user's generation of the custom function block may be facilitated by a graphical user interface, a text editor or the like that may, for example, enable the user to click and drag icons representing components of function blocks from library files or other files to assemble the icons and, thus, the files that they represent, to form a function block. Additionally, the user may be able to edit or modify source code files to include a particular function, algorithm or procedure that is not provided by a standard function block.

At block 204, the completed source code file or files generated, created or built at block 202 may be compiled and linked to create a corresponding object code file or files (e.g., a dynamic link library (DLL) file or files). Preferably, but not necessarily, the compiling and linking of the source code file or files may be carried out by the user or, if desired, could instead be carried out by some other entity. At block 206, the compiled and linked source code file or files associated with the custom function block may be transferred to the provider of the target process control system. The provider may be the installer, the manufacturer and/or any entity other than the user associated with the target process control system. Additionally, the transfer of the compiled and linked source code file or files may be carried out using any desired technique such as, for example, electronic transmission via a wireless and/or hardwired communication network, which may include use of the Internet, transmission via some type of tangible storage medium such as, for example, magnetic or optical storage disks or other devices, transmission via printed hardcopy, etc.

At block 208, the entity receiving the compiled and linked source code for the custom function block may validate that the custom function block will operate properly within the target control system. Also, the receiving entity may determine that the custom function block, when executed, will not violate the terms and conditions of any licensing agreement that may be in effect between the receiving entity and the entity responsible for creation of the custom function block. If the custom function block is not valid, then block 210 passes control to block 212, at which the user may be notified that the custom function block does not meet licensing requirements and/or that the custom function block will not function properly within the target process control system.

On the other hand, if the custom function block is valid (i.e., licensing and/or operational requirements have been satisfied or have not been violated), then block 210 passes control to block 214. At block 214, the entity receiving the compiled and linked source code file for the custom function block may append or add a digital signature to the compiled and linked custom function block file. Of course, any other type of security or verification measure could be used instead of a digital signature. Alternatively, the digital signature or other security/verification measure could be provided in a separate digital file, which may be embodied in a separate storage device or medium.

At block 216, the validated custom function block file is transferred back to the user or the entity responsible for creating or building the custom function block. The custom function block file may be transferred back with a digital signature or some other security measure as described above. As with the file transfer at block 206, the file transfer at block 216 may be carried out using any desired communication technique, including wireless and/or hardwired electronic transfers.

At block 218, the user or entity responsible for creating the custom function block may incorporate the custom function block into the target control system so that the system user can select and use the custom function block in a manner similar or identical to the manner in which standard function blocks may be used to design and execute process control procedure, algorithms, etc. Preferably, but not necessarily, the technique shown by way of example in FIG. 2 would be followed for custom function blocks that are to be used as released or production function blocks. Thus, the technique shown by way of example in FIG. 2 would not necessarily have to be used for carrying out design development within a debugging mode or some other developmental mode. In this manner, a user could freely experiment during the process of developing control system procedures using custom function blocks without having to engage in time consuming file transfers, validation procedures, etc. However, once the user has developed a custom function block or library of custom function blocks that is to be incorporated into the control system and used in a released or production capacity, the user may be compelled to follow a procedure similar or identical to that shown and described in connection with FIG. 2.

Although the technique depicted by way of example in FIG. 2 is described in connection with creation and validation of a single custom function block, the technique depicted in FIG. 2 is more generally applicable. For example, a plurality of custom function blocks may be created and validated using the technique shown in FIG. 2 at substantially the same time. Furthermore, some or all of the plurality of custom function blocks may be contained within a single library or multiple libraries, if desired.

By, way of example only, the custom function blocks and the manner of creating the custom function blocks described herein may be used to facilitate validation procedures such as, for example, validation procedures that may be required by the Food and Drug Administration (FDA). Additionally, if desired, the custom function blocks and creation technique described herein enables custom function blocks to be developed and distributed in compiled form, thereby making it more difficult, perhaps impossible, for entities other than the creator of the function blocks to reverse engineer or determine how the custom function blocks function. As a result, the custom function blocks described herein may be developed and distributed in a compiled form to enable developers to maintain the developed function blocks as proprietary.

If implemented in software, the functional blocks and software routines discussed herein may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of incorporating a custom function block within a process control system, the method comprising:
generating the custom function block by combining a plurality of files from a group of files generated by a provider of the process control system to form a source code file associated with the custom function block and modifying one of the plurality of files within the source code file to include a procedure not included within the group of files, wherein the source code file includes a write checking routine which validates data written to data items in the custom function block from a source outside of the custom function block, by determining one or both of: (1) whether the data items can be written to by the source outside of the custom function block, or (2) whether the data written to the data items is within one or more predetermined threshold limits;
compiling and linking the source code file to form a compiled/linked custom function block file;
transferring the compiled/linked custom function block file to the provider of the process control system;
validating the compiled/linked function custom block file;
appending a security measure to the compiled/linked custom function block file to form a validated custom function block file;
transferring the validated custom function block file to a user of the process control system; and
incorporating the validated custom function block file within the process control system such that the custom function block conveys information between first and second other function blocks, at least one of which first and second other function blocks is incompatible with the process control system in the absence of the custom function block,
wherein the incorporated custom function block is operable to enable the execution of an external system, application, or algorithm associated with at least one of the first and second other function blocks to be synchronized with the execution of a process control scheme executed by the process control system.

2. The method of claim 1, wherein transferring the compiled/linked function block file to the provider of the process control system includes transmitting the compiled/linked function block file using one of a wireless and a hardwired communication technique.

3. The method of claim 1, wherein validating the compiled/linked function block file includes determining whether the function block complies with one of licensing requirements and operational characteristics of the process control system.

4. The method of claim 1, wherein appending the security measure to the compiled/linked function block file to form the validated function block file includes associating a digital signature with the function block.

5. A method of using a custom function block within a process control system, the method comprising:
receiving custom function block information from a user of the process control system, wherein the custom function block includes a write checking routine which validates data written to data items in the custom function block from a source outside of the custom function block, by determining one or both of: (1) whether the data items can be written to by the source outside of the custom function block, or (2) whether the data written to the data items is within one or more predetermined threshold limits;
determining whether the custom function block information is valid;
generating security information in response to a determination that the custom function block information is valid;
associating the generated security information with the custom function block;
sending the generated security information to the user if the custom function block information is valid; and
incorporating the custom function block into the process control system such that the custom function block is operable to convey information between first and second other function blocks, at least one of which first and second other function blocks is incompatible with the process control system in the absence of the custom function block.

6. The method of claim 5, wherein generating the security information in response to the determination that the function block information is valid includes generating a digital signature.

7. The method of claim 5, wherein associating the generated security information with the function block includes adding the generated security information to the function block information.

8. The method of claim 5, wherein determining whether the custom function block information is valid includes determining whether the custom function block information complies with one of licensing requirements and operational requirements of the process control system.

9. A method of using a custom function block, comprising:
conveying information from a data source to the custom function block;
processing the information from the data source based on a function within the custom function block; and
conveying at least some of the processed information to a process control system application,
wherein the custom function block comprises a combination of a plurality of files selected from a group of files generated by a provider of the process control system to form a source code file associated with the function block, one of the plurality of files within the source code file modified to include a procedure not included within the group of files, wherein the source code file includes a write checking routine which validates data written to data items in the custom function block from a source outside of the custom function block, by determining one or both of: (1) whether the data items can be written to by the source outside of the custom function block, or (2) whether the data written to the data items is within one or more predetermined threshold limits, and
wherein the custom function block is operable to convey information between a first function block associated with the data source and a second function block associated with the process control system application, the first function block incompatible with the process control system and requiring the custom function block to convey information to the second function block.

10. The method of claim 9, wherein conveying the information from the data source to the custom function block includes conveying the information from one of an application, an algorithm, a device and a system external to the process control system application to the custom function block.

11. The method of claim 9, wherein conveying the information from the data source to the custom function block includes conveying process control information.

12. The method of claim 9, wherein processing the information from the data source based on the function within the custom function block includes mapping the information to a parameter associated with the process control system application.

13. The method of claim 9, wherein processing the information from the data source based on the function within the custom function block includes calculating a parameter used by the process control system application based on the information from the data source.

14. The method of claim 9, wherein conveying the information from the data source to the custom function block includes conveying the information from one of a device, a function block and a parameter within the process control system application to the custom function block.

15. The method of claim 14, wherein processing the information from the data source based on the function within the custom function block includes performing a calculation not performed by the process control system application.

16. A method of using a custom function block, comprising:
communicatively interposing the custom function block between a process control system application and a data source, the process control system application configured to operate with a first process control system type and the data source configured to operate with a second, incompatible process control system type; and
conveying information between the process control system application and the data source based on a function performed by the custom function block,
wherein the custom function block comprises a combination of a plurality of files selected from a group of files generated by a provider of the process control system to form a source code file associated with the function block, one of the plurality of files within the source code file modified to include a procedure not included within the group of files, wherein the source code file includes a write checking routine which validates data written to data items in the custom function block from a source outside of the custom function block, by determining one or both of: (1) whether the data items can be written to by the source outside of the custom function block, or (2) whether the data written to the data items is within one or more predetermined threshold limits, and
wherein the custom function block is operable to integrate the data source into a process control system such that the process control system application and the data source cooperate seamlessly.

17. The method of claim 16, wherein communicatively interposing the custom function block between the process control system application and the data source includes communicatively interposing the custom function block between the process control system application and one of a function block, a device and a parameter associated with the process control system application.

18. The method of claim 16, wherein communicatively interposing the custom function block between the process control system application and the data source includes communicatively interposing the custom function block between the process control system application and one of a system, device and an application external to the process control system application.

19. The method of claim 16, wherein conveying the information between the process control system application and the data source based on the function performed by the custom function block includes mapping at least some of the information to a parameter used by the process control system application.

20. The method of claim 16, wherein conveying the information between the process control system application and the data source based on the function performed by the custom function block includes calculating a value based on at least some of the information and associating the value with a parameter used by the process control system application.

21. A method of using a custom function block, comprising:
    communicatively interposing the custom function block between a process control application and a data source external to the process control application, the data source configured for a second process control system incompatible, in the absence of the custom function block, with a first process control system associated with the process control application; and
    conveying information between the process control application and the data source external to the process control application based on a function performed by the custom function block,
    wherein the custom function block comprises a combination of a plurality of files selected from a group of files generated by a provider of the process control system to form a source code file associated with the custom function block, one of the plurality of files within the source code file modified to include a procedure not included within the group of files, wherein the source code file includes a write checking routine which validates data written to data items in the custom function block from a source outside of the custom function block, by determining one or both of: (1) whether the data items can be written to by the source outside of the custom function block, or (2) whether the data written to the data items is within one or more predetermined threshold limits.

22. The method of claim 21, wherein communicatively interposing the function block between the process control application and the data source external to the process control application includes communicatively interposing the function block between the process control application and one of a system, device and an application external to the process control application.

23. The method of claim 21, wherein conveying the information between the process control application and the data source external to the process control application based on the function performed by the function block includes mapping at least some of the information to a parameter used by the process control application.

24. The method of claim 21, wherein conveying the information between the process control application and the data source external to the process control application based on the function performed by the function block includes calculating a value based on at least some of the information and associating the value with a parameter used by the process control application.

25. A method of using a custom function block, comprising:
    operatively integrating a data source external to a process control application with the process control application via the custom function block, the data source configured for a second process control system incompatible, in the absence of the custom function block, with a first process control system associated with the process control application; and
    conveying information between the process control application and the data source external to the process control application based on at least one of a data mapping function, a data conversion function and a data translation function performed by the custom function block,
    wherein the custom function block comprises a combination of a plurality of files selected from a group of files generated by a provider of the process control system to form a source code file associated with the custom function block, one of the plurality of files within the source code file modified to include a procedure not included within the group of files, wherein the source code file includes a write checking routine which validates data written to data items in the custom function block from a source outside of the custom function block, by determining one or both of: (1) whether the data items can be written to by the source outside of the custom function block, or (2) whether the data written to the data items is within one or more predetermined threshold limits.

* * * * *